United States Patent

Newman

(10) Patent No.: US 9,867,339 B2
(45) Date of Patent: Jan. 16, 2018

(54) HIGH VOLUME, AERATED WATERING WAND SYSTEM

(71) Applicant: Christopher J. Newman, Santa Cruz, CA (US)

(72) Inventor: Christopher J. Newman, Santa Cruz, CA (US)

( * ) Notice: Subject to any disclaimer, the term of this patent is extended or adjusted under 35 U.S.C. 154(b) by 159 days.

(21) Appl. No.: 14/947,451

(22) Filed: Nov. 20, 2015

(65) Prior Publication Data

US 2016/0309668 A1    Oct. 27, 2016

Related U.S. Application Data

(60) Provisional application No. 62/151,613, filed on Apr. 23, 2015.

(51) Int. Cl.
*A01G 25/09*    (2006.01)
*A01G 25/14*    (2006.01)
*B05B 7/02*     (2006.01)
*A01G 25/02*    (2006.01)

(52) U.S. Cl.
CPC .......... *A01G 25/145* (2013.01); *A01G 25/02* (2013.01); *A01G 25/14* (2013.01); *B05B 7/02* (2013.01)

(58) Field of Classification Search
CPC ...... A01G 25/145; A01G 25/00; A01G 25/14; B05B 7/02
USPC ....... 239/172, 302, 373, 530, 337, 447, 525, 239/526, 532, 456, 458, 587.1, 587.5, 239/588, 270, 280, 587.2, 587.3
See application file for complete search history.

(56) References Cited

U.S. PATENT DOCUMENTS

| 2,562,328 | A | * | 7/1951 | Null | B05B 1/14 210/459 |
| 3,554,451 | A | | 1/1971 | Aghnides | |
| 6,135,361 | A | * | 10/2000 | Grassi | A01G 25/145 239/172 |
| 6,189,743 | B1 | | 2/2001 | Hough | |
| 7,625,488 | B2 | | 12/2009 | Blackburn | |
| 2003/0230640 | A1 | * | 12/2003 | Restaino, Jr. | A01C 23/042 239/310 |
| 2004/0118940 | A1 | * | 6/2004 | Lavitt | A01G 25/145 239/302 |
| 2004/0134847 | A1 | * | 7/2004 | Lin | B01F 5/0665 210/202 |

FOREIGN PATENT DOCUMENTS

DE    202014002707    *    5/2014    ............. A01G 25/00

OTHER PUBLICATIONS

DE202014002707 English Translation, Fabbender, Germany.*

* cited by examiner

*Primary Examiner* — Arthur O Hall
*Assistant Examiner* — Joel Zhou
(74) *Attorney, Agent, or Firm* — Thomas Schneck

(57) ABSTRACT

A rigid wand receives water under pressure from a pump. A canister of larger diameter than the wand receives the water from the wand with impact on flow disruptive material promoting aeration by turbulence. A large number of peripheral outlet ports allow water to tumble out of the canister through the ports.

5 Claims, 2 Drawing Sheets

HIGH VOLUME, AERATED WATERING WAND SYSTEM

CROSS-REFERENCE TO RELATED APPLICATION

This application claims priority from provisional application Ser. No. 62/151,613 filed Apr. 23, 2015.

TECHNICAL FIELD

The present invention relates to watering tools and more specifically to an aerating watering wand.

BACKGROUND

When watering plants, it is desirable to avoid high pressure nozzles that impact and disturb soil and can injure sensitive plants. It is preferred to have water dispensed during watering at a lower pressure. It is also helpful to have aeration of water and mixing into the water any chemicals, such as nutrients, prior to dispensing the water.

SUMMARY

A watering system uses a water reservoir supplying water to a pump and then to a supply hose. A wand is attached to the supply hose from the pump under pressure such that sheath flow of water is established. The term "sheath flow" means that a wall of water moves in the conduit. This wand has a diameter similar to the hose, or slightly larger, where the sheath flow begins to collapse. The wand terminates in a cylindrical outlet canister that has at least twice the diameter of the wand, completely disrupting the remaining sheath flow, reducing pressure, and inducing turbulence that allows mixing of oxygen with the water. The canister is perforated, with the perforations greater than 50% of the lateral area of the canister, or between 50% and 80% of the lateral area of the canister. The canister distal end is closed. The canister may be filled with a loose, flow disruptive material, such as marbles or lava rocks. Water leaving the canister leaves under low pressure, aerated conditions.

DETAILED DESCRIPTION

Figure 1:
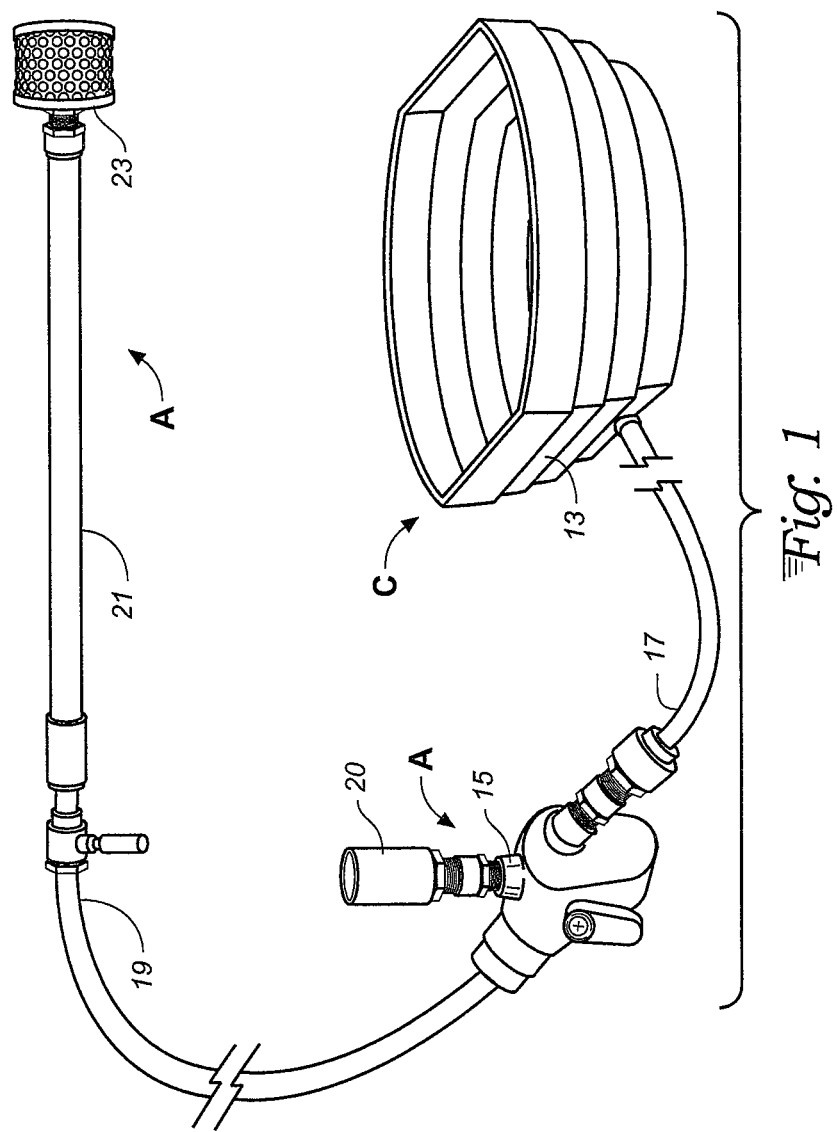
FIG. 1 is a perspective view of the watering wand system of the invention.

With reference to FIG. 1, the portable reservoir 13 feeds water, sometimes mixed with nutrients, to an electrical pump 15, preferably a one horsepower irrigation pump via a 1¼ to 1½ inch diameter hose 17. Water from the pump 15 goes into a one inch hose 19 past a valve 20 in a manner that fills a cross-section of the hose establishing a sheath flow, i.e., a flow that fills the hose forming a wall of water moving in the hose. The hose feeds a 1¼ inch diameter watering wand 21 that is typically a rigid plastic pipe that is at least 36 inches long. In going from the one inch hose 19 to the larger diameter wand 21 there is a slight drop in pressure and the sheath flow starts to collapse although the wand is mostly full of water. There is a further drop in pressure as water passes from the wand 21 into water outlet canister 23 that has a diameter at least twice the diameter of the wand 21. The canister contains marbles, or the like, such that collapse of the the sheath flow from the wand is complete as water tumbles into the canister in a turbulent manner. The canister has water outlet ports in peripheral walls and the contents of the canister should not block outlet ports nor increase pressure of the flow.

Figure 2:
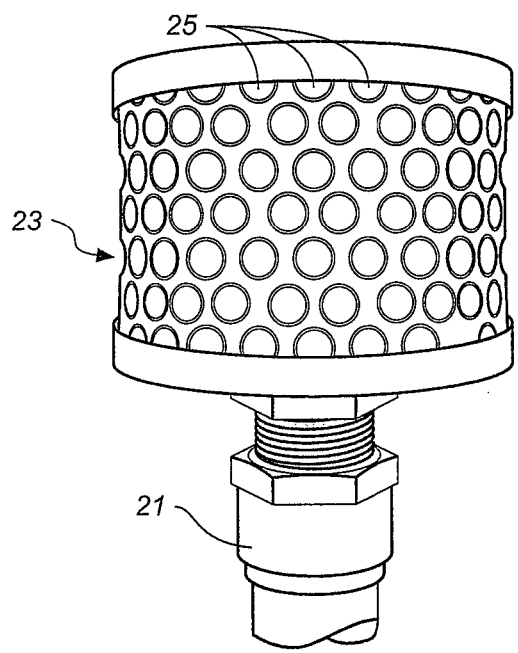
FIG. 2 is a side view of a canister used in the system of FIG. 1.

With reference to FIG. 2, the water outlet canister 23 has a pattern of circumferential or peripheral perforations 25 that account for more than 50% of the lateral area of the canister and perhaps as much as 80%. The canister 23 holds loose flow disruptive material, usually an inert aggregate, such as marbles, lava rock, or plastic fibers that are several inches long, not packed together, that do not substantially increase back pressure, but create turbulence in the flow stream, promoting mixing of any chemicals added to the water by material in the canister, as well as promoting aeration of the water.

Figure 3:
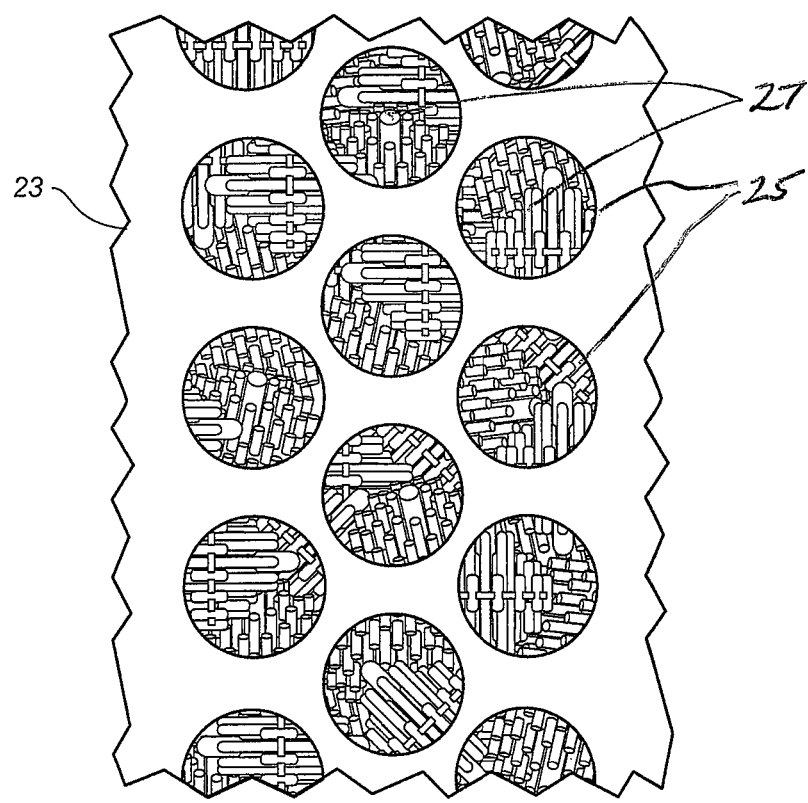
FIG. 3 is a peripheral wall detail view of the canister of FIG. 2.

Depending on the selection of the flow disruptive material, a fine wire screen between the material and the inside wall of the canister may be used to retain the material within the canister. For example, for marbles or lava rock, a wire screen with quarter-inch wire spacing is needed to prevent the materials from escaping the canister 23 through peripheral wall holes. In the case where the plastic fibers in the outlet canister may be Fiberglas fibers, similar in packing density to home heater filter Fiberglas material, or biological water filter media, usually plastic fibers formed as spikes in a ball, known under the trademark Bio Balls, are used, no wire screen is needed because these materials will not escape from the canister due to their construction. See FIG. 3 for Bio Balls 27 in canister 23 held in place behind perforations 25 because the Bio Balls are bigger than perforations 25. Bio-Ball is a registered trademark of Mitsui Zosen Eno. Eng. Corp. of Japan. It is preferable that the canister filler material be of the kind where the wire screen is not needed to avoid the risk of clogging of the screen over time. Marbles, if used in the canister, should be no larger than about one inch in diameter and completely pack the interior of the canister, with the interstices between marbles causing mixing and aeration by turbulence. The end 27 of canister 23 is blocked, so that all water flow is radial relative to the axis of pipe 21 and flows out of the peripheral ports or perforations. Because the circumferential perforations 25 constitute a large areawise flow region compared to the cross sectional area of pipe 21, water gently pours out of the outlet head 23, without jetting, while at the same time air enters the head 23 for mixing.

What is claimed is:

1. A watering wand system comprising:
   a water reservoir;
   a pump connected to said water reservoir;
   a hose having a first diameter joined to said pump to receive water in a sheath flow;
   a rigid wand having a second diameter greater than the first diameter creating a first water pressure reduction and having a first end attached to said hose, and having a second end opposite to the first end;
   a cylindrical outlet canister attached to the second end of the wand, the cylindrical outlet canister having a diameter at least two times the second diameter of the wand, creating a second water pressure reduction, the canister outlet canister having outlet ports in a peripheral wall allowing free flow of water from the canister without an increase in water pressure;

wherein said water outlet ports are a pattern of canister perforations in the cylindrical outlet canister peripheral wall that account for greater than 50% of a lateral area of said canister wall; and wherein the cylindrical outlet canister is filled with spherical balls of fibers of the type used for filtering water arranged in a flow disruptive relationship.

2. The watering wand system of claim 1, wherein said cylindrical outlet canister has a pattern of perforations in the canister peripheral wall that account for between 50% and 80% of a lateral area of said canister.

3. A watering wand system comprising:
a water reservoir;
a pump connected to said water reservoir;
a hose having a first diameter joined to said pump to receive water in a sheath flow;
a rigid wand having a second diameter greater than the first diameter creating a first water pressure reduction and having a first end attached to said hose, and having a second end opposite to the first end, wherein the second diameter allows the sheath flow to collapse;
a cylindrical outlet canister attached to the second end of the wand, the cylindrical outlet canister having a diameter at least two times the wand diameter wherein the collapse of the sheath flow is complete, creating a second water pressure reduction, the canister having outlet ports in a peripheral wall allowing free flow of water from the canister without an increase in pressure;
flow disruptive spherical balls of fibers of the type used for filtering water located in the cylindrical outlet canister, for inducing turbulence in the water; and wherein said water outlet ports are a pattern of cylindrical outlet canister perforations in the canister peripheral wall that account for greater than 50% of a lateral area of said canister wall.

4. The watering wand system of claim 3, wherein said cylindrical outlet canister has a pattern of perforations in the canister peripheral wall that account for between 50% and 80% of a lateral area of said canister.

5. A watering wand system comprising:
a water reservoir having an outlet port with water under pressure;
a first conduit connected to the reservoir outlet port, the first conduit having a first diameter wherein a sheath flow from the reservoir is established;
a second conduit connected to the first conduit having a second diameter, greater than the first diameter wherein the sheath flow begins to collapse creating a first water pressure reduction; and
an outlet canister attached to the second conduit having a third diameter greater than the second diameter wherein the collapse of the sheath flow is complete, creating a second water pressure reduction, the canister having outlet ports in a peripheral wall allowing free flow of water from the canister without an increase in pressure;
wherein the outlet ports are a pattern of cylindrical outlet canister perforations in the canister peripheral wall that account for greater than 50% of a lateral area of said canister wall;
flow disruptive spherical balls of fibers of the type used for filtering water located in the canister, for inducing turbulence in the water.

* * * * *